United States Patent
Long et al.

(10) Patent No.: US 10,469,545 B2
(45) Date of Patent: Nov. 5, 2019

(54) MULTIMEDIA SESSION CALL CONTROL METHOD AND APPLICATION SERVER

(71) Applicant: NOKIA TECHNOLOGIES OY, Espoo (FI)

(72) Inventors: Shuiping Long, Beijing (CN); Hui Jin, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/708,818

(22) Filed: May 11, 2015

(65) Prior Publication Data

US 2015/0244746 A1 Aug. 27, 2015

Related U.S. Application Data

(63) Continuation of application No. 12/772,515, filed on May 3, 2010, now Pat. No. 9,031,057, which is a (Continued)

(30) Foreign Application Priority Data

Nov. 5, 2007 (CN) .......................... 2007 1 0165783

(51) Int. Cl.
    *H04L 12/66* (2006.01)
    *H04L 29/06* (2006.01)
    *H04L 12/18* (2006.01)

(52) U.S. Cl.
    CPC ...... *H04L 65/1093* (2013.01); *H04L 65/1063* (2013.01); *H04L 65/1069* (2013.01); *H04L 65/403* (2013.01)

(58) Field of Classification Search
    CPC . H04L 65/1063; H04L 65/60; H04L 65/1066; H04L 65/403
    (Continued)

(56) References Cited

U.S. PATENT DOCUMENTS

| | | | |
|---|---|---|---|
| 2003/0043740 A1* | 3/2003 | March ............... | H04L 29/06027 370/229 |
| 2003/0059015 A1* | 3/2003 | Eber ....................... | H04M 3/56 379/201.02 |

(Continued)

FOREIGN PATENT DOCUMENTS

| CN | 1980225 A | 6/2007 |
|---|---|---|
| CN | 101026616 A | 8/2007 |

(Continued)

OTHER PUBLICATIONS

Partial English Translation and Abstract of Japanese Patent Application No. JP10032652A, 2015, 13 pages.

(Continued)

*Primary Examiner* — Asad M Nawaz
*Assistant Examiner* — Jason A Harley
(74) *Attorney, Agent, or Firm* — Squire Patton Boggs (US) LLP

(57) ABSTRACT

A multimedia session call control method and an Application Server (AS). The multimedia session call control method includes these steps: a multi-UE party performs a multimedia session with a peer under control of an AS; a master UE of the multi-UE party establishes a session with a third party under control of the AS; and the AS binds a call leg between a slave UE of the multi-UE party and the AS to the session established with the third party.

6 Claims, 13 Drawing Sheets

Related U.S. Application Data continuation of application No. PCT/CN2008/072924, filed on Nov. 4, 2008.

(58) Field of Classification Search
USPC .......................................... 370/261; 710/311
See application file for complete search history.

(56) References Cited

U.S. PATENT DOCUMENTS

| | | | |
|---|---|---|---|
| 2004/0001512 A1 | 1/2004 | Challener et al. | |
| 2004/0037219 A1* | 2/2004 | Shaffer | H04L 29/06027 370/217 |
| 2004/0190498 A1* | 9/2004 | Kallio | H04M 7/128 370/352 |
| 2004/0240656 A1 | 12/2004 | Poustchi | |
| 2005/0135374 A1* | 6/2005 | Isomaki | H04M 3/42382 370/395.2 |
| 2006/0083244 A1 | 4/2006 | Jagadesan et al. | |
| 2007/0071216 A1* | 3/2007 | Shen | H04L 65/1006 379/221.08 |
| 2007/0140223 A1* | 6/2007 | Bhatia | H04L 65/605 370/352 |
| 2007/0201510 A1 | 8/2007 | Agarwal et al. | |
| 2007/0250569 A1 | 10/2007 | Mutikainen et al. | |
| 2008/0141343 A1* | 6/2008 | Kumar | H04L 63/101 726/3 |
| 2008/0273671 A1* | 11/2008 | Miao | H04M 3/42017 379/87 |
| 2008/0301308 A1 | 12/2008 | Li et al. | |
| 2008/0304451 A1* | 12/2008 | Thompson | H04W 36/0022 370/331 |
| 2009/0082050 A1* | 3/2009 | Razdan | H04W 76/45 455/518 |
| 2009/0067408 A1 | 4/2009 | Leppainen et al. | |
| 2010/0226287 A1* | 9/2010 | Horvath | H04L 12/1822 370/260 |
| 2011/0055405 A1 | 3/2011 | Li et al. | |

FOREIGN PATENT DOCUMENTS

| | | |
|---|---|---|
| EP | 1578152 A1 | 9/2005 |
| EP | 1959608 A1 | 8/2008 |
| JP | 10032652 A | 2/1998 |
| JP | 2004075518 A | 4/2004 |
| JP | 2007529936 A | 10/2007 |
| WO | 2004075518 A1 | 9/2004 |
| WO | 2006010953 A2 | 2/2006 |
| WO | 2006044098 A1 | 4/2006 |
| WO | 2006064480 A1 | 6/2006 |
| WO | 2008041111 A2 | 4/2008 |
| WO | 2009059559 A1 | 5/2009 |

OTHER PUBLICATIONS

Partial English Translation and Abstract of Japanese Patent Application No. JP2004075518A, 2015, 6 pages.
Partial English Translation and Abstract of Japanese Patent Application No. JP2007529936A, 2015, 2 pages.
Elleuch, W., et al., "Enabling Session Mobility in Full Mesh Conferencing Model," Wireless and Mobile Computing, Networking and Communications, 2007, 8 pages.
"VCC Information Exchange," 3GPP TSG SA WG2 Architecture—Ad-Hoc Meeting, S2H050243, Oct. 11-14, 2005, 30 pages.
"3rd Generation Partnership Project; Technical Specification Group Service and Architecture; Feasibility Study on Multimedia Session Continuity; Stage 2; (Release 8)," 3GPP TR 23.893, V0.3.0, Technical Report, Oct. 2007, 33 pages.
"3rd Generation Partnership Project; Technical Specification Group Services and System Aspects; IP Multimedia System (IMS) centralized services (Release 8)," 3GPP TR 23.892, V1.3.0, Technical Report, Oct. 2007, 142 pages.
Sparks, R., et al., "The Session Initiation Protocol (SIP) Refer Method," RFC 3515, Apr. 2003, 24 pages.
Foreign Communication From a Counterpart Application, Japanese Application No. 2010-531404, Japanese Office Action dated Apr. 10, 2012, 3 pages.
Foreign Communication From a Counterpart Application, Japanese Application No. 2010-531404, English Translation of Japanese Office Action dated Apr. 10, 2012, 3 pages.
Foreign Communication From a Counterpart Application, European Application No. 08846806.1, European Notice of Opposition to European Patent dated May 7, 2014, 19 pages.
Foreign Communication From a Counterpart Application, PCT Application No. PCT/CN2008/072924, International Search Report dated February 5, 2009, 4 pages.
Foreign Communication From a Counterpart Application, PCT Application No. PCT/CN2008/072924, Written Opinion dated Feb. 5, 2009, 3 pages.
Foreign Communication From a Counterpart Application, Chinese Application No. 200710165783.9, Chinese Office Action dated Jan. 4, 2012, 5 pages.
Foreign Communication From a Counterpart Application, Chinese Application No. 200710165783.9, Partial Translation of Second Chinese Office Action dated Jan. 4, 2012, 5 pages.
Foreign Communication From a Counterpart Application, Korean Application No. 10-2010-7010950, Korean Office Action dated Nov. 21, 2011, 4 pages.
Office Action dated Jul. 11, 2013, 24 pages, U.S. Appl. No. 12/772,515, filed May 3, 2010.
Office Action dated Jan. 2, 2014, 27 pages, U.S. Appl No. 12/772,515, filed May 3, 2010.
Notice of Allowance dated Jan. 20, 2015, 17 pages, U.S. Appl. No. 12/772,515, filed May 3, 2010.

\* cited by examiner

MULTIMEDIA SESSION CALL CONTROL METHOD AND APPLICATION SERVER

CROSS-REFERENCE TO RELATED APPLICATIONS

This application is a continuation of U.S. patent application Ser. No. 12/772,515, filed on May 3, 2010, which is a continuation of International Application PCT/CN2008/072924, filed on Nov. 4, 2008. The International Application claims priority to Chinese Patent Application No. 200710165783.9, filed on Nov. 5, 2007. The aforementioned patent applications are hereby incorporated by reference in their entireties.

FIELD OF THE INVENTION

The present invention relates to multimedia communication technologies, and in particular, to a multimedia session call control method and an Application Server (AS).

BACKGROUND OF THE INVENTION

With the development of radio communications, users impose higher and higher requirements on Quality of Service (QoS) and diversification, thus giving rise to numerous Value Added Services (VASs). Being convenient and quickly available, the VASs meet the diversification requirements of the users.

Currently, the technology of multimedia session call transfer enables transfer of a user session and transfer of media streams between User Equipments (UEs), as described below with the Explicit Call Transfer (ECT) service as an example.

The ECT service falls into two types: interrogating ECT and blind ECT:

The detailed process of the interrogating ECT includes the following steps:

A first UE (UE-1) performs a multimedia session with a second UE (UE-2);

UE-1 holds the call with UE-2;

UE-1 establishes a call with a third UE (UE-3), and keeps a conversion with UE-3 for a period;

UE-1 quits the session; and

UE-2 connects to UE-3 for a conversation.

The detailed process of the blind ECT includes these steps: UE-1 performs a multimedia session with UE-2; UE-1 sends the address of UE-3 to UE-2; UE-2 establishes a conversion with UE-3, and UE-1 quits.

With the development of the multimedia transmission technology, the user services are diversified, including not only the voice service, but also the video service and file transfer. The Packet Switched (PS)-based Internet Protocol (IP) Multimedia Subsystem (IMS) will be the development trend.

The current multimedia session technology enables one user to operate multiple UEs simultaneously and perform a multimedia session with the peer. Multiple UEs operated by the user may be integrated, for example, into a dual-mode UE. A user may use multiple UEs to talk with the peer through call transfer performed in the following way:

As shown in FIG. 1, suppose that UE-1, UE-2, and UE-3 are performing a multimedia session. The session includes three types of media streams: voice, video, and text. Two types of media streams are exchanged between UE-1 and UE-3, and one type of media streams is exchanged between UE-2 and UE-3. In this case, UE-3 transfers the session to UE-4.

In FIG. 1, both the Serving Call Session Control Function (S-CSCF) and the Multimedia Session Continuity (MMSC) AS are in the home network of UE-1. The S-CSCF and the MMSC AS in the home networks of UE-2, UE-3, and UE-4 are omitted.

Step 1: UE-3 initiates an ECT request. The ECT request is a Refer, namely, call transfer, message and carries the address of UE-4. This message is transmitted through the S-CSCF of UE-1 to the MMSC AS of UE-1.

The MMSC technology enables a multimedia session to be continuous between different access networks or different UEs. The core of the MMSC technology is the MMSC AS. All calls and sessions of a user need to pass through the MMSC AS of the IMS domain. The MMSC AS acts as a Back-to-Back User Agent (B2BUA) to prepare for the subsequent multimedia session continuity. This process is known as "anchoring in IMS". All calls initiated by an MMSC user from different access networks or different UEs need to be routed to the MMSC AS to undergo the anchoring process, and then sent to the called party. Likewise, all calls or sessions directed to the MMSC user need to be routed to the MMSC AS for anchoring.

Step 2: The MMSC AS sends the Refer message to UE-2.

Step 3: The MMSC AS sends the Refer message to UE-1.

The MMSC AS is a B2BUA. According to the anchoring information existent at the time of establishing the call, the MMSC AS splits the Refer message into two Refer messages, which are sent to UE-2 and UE-1 respectively through step 2 and step 3

The B2BUA is defined as two user agents that are connected back to back. For example, in the anchoring implemented by the AS, UE-1 sends an Invite, namely, a call request, message to UE-2 on the peer side. After the call arrives at the AS, the AS terminates the Invite message, generates a new Invite message and sends it to UE-2 on the peer side. In this case, the AS acts as a B2BUA. The connection between UE-1 and the AS is dialog-1, and the connection between the AS and UE-2 is dialog-2. The AS binds dialog-1 and dialog-2 together. The dialog processing mechanism maintains the sequence and the transmission path of the messages between the two UAs. A dialog is a peer-to-peer relation between two UAs.

Steps 4-5: UE-1 and UE-2 return a 202 OK message respectively.

Step 6: According to the anchoring information, the MMSC AS integrates the two 202OK messages and sends them to UE-3.

Step 7: After receiving the OK message, UE-3 sends a BYE message to release the session.

Steps 8-9: According to the anchoring information, the MMSC AS sends the BYE message to UE-1 and UE-2 respectively. After step 9, the signaling and media connections between UE-1, UE-2, and UE-3 are cut off.

Steps 10-11: UE-1 and UE-2 send an Invite message to UE-4 respectively.

Step 12: The MMSC AS anchors and correlates the two Invite messages, and sends the Invite message to UE-4.

In the process of developing the present invention, the inventor finds at least the following defects in the prior art:

In the call transfer method in the prior art, a mechanism of disconnecting and reconstructing a session is applied. The existing multimedia session between the party who uses multiple UEs (multi-UE party) and the peer is released, and a new multimedia session is established between the multi- UE party and the third party. The whole process is troublesome and the signaling flow is complicated, and the implementation is time-consuming and inefficient.

SUMMARY OF THE INVENTION

A multimedia session call control method is provided in various embodiments of the present invention to simplify the call transfer process, to shorten the call transfer time and to improve efficiency.

A multimedia session call control method provided in one embodiment of the present invention includes: performing, by a multi-UE party, a multimedia session with a peer under control of an AS; establishing, by a master UE of the multi-UE party, a session with a third party under control of the AS; and binding, by the AS, a call leg between a slave UE of the multi-UE party and the AS to the session established with the third party.

A multimedia session call control method provided in another embodiment of the present invention includes: performing, by a multi-UE party, a multimedia session with a peer under control of an AS; establishing, by the AS, a call leg with a third party in place of the multi-UE party; and binding, by the AS, the call leg already established with each UE of the multi-UE party to the call leg established with the third party, and establishing a session connection between each UE of the multi-UE party and the third party.

A multimedia session call control method provided in still another embodiment of the present invention includes: performing, by a multi-UE party, a multimedia session with a second party under control of an AS; performing, by the multi-UE party, a multimedia session with a third party under control of the AS; sending, by a master UE of the multi-UE party, a Refer message to the second party, where the Refer message requires the second party to establish a session with the third party, carries an identifier (ID) of a call leg between the master UE and the AS, and is routed to the AS; modifying, by the AS, the ID of the call leg in the Refer message to an ID of the call leg between the AS and the third party, and sending the Refer message to the second party; sending, by the second party, an Invite message to the third party, where the Invite message carries the ID of the call leg between the AS and the third party; accepting, by the third party, the invitation, and establishing a session with the second party; and releasing, by the third party, the session of the call leg indicated by the ID according to the ID of the call leg.

An AS provided in one embodiment of the present invention includes: a session control unit, configured to control a multi-UE party to perform a multimedia session with a peer; a call establishment unit, configured to control a master UE of the multi-UE party to establish a session with a third party; and a call binding unit, configured to bind a call leg between a slave UE of the multi-UE party and the peer to the session established with the third party.

An AS provided in an embodiment of the present invention includes: a session control unit, configured to control a multi-UE party to perform a multimedia session with a peer; a call establishment unit, configured to establish a call leg with a third party in place of the multi-UE party; and a call binding unit, configured to: bind a call leg already established with each UE of the multi-UE party to the call leg established with the third party, and establish a session connection between each UE of the multi-UE party and the third party.

The embodiments of the present invention bring the following benefits:

According to the embodiments of the present invention, in the multimedia session established between the multi-UE party and the third party, all or part of the existing call legs are reused. By contrast, in the prior art, a multimedia session needs to be reconstructed to implement call transfer. Therefore, the embodiments of the present invention simplify the signaling flow of call transfer, shorten the call transfer time, improve the system processing efficiency, and enhance the user experience.

DETAILED DESCRIPTION OF THE INVENTION

A multimedia session call control method is provided in various embodiments of the present invention to simplify the call transfer process, to shorten the call transfer time and to improve efficiency. The multimedia session call control method under the present invention is detailed below.

First Embodiment

Figure 1:
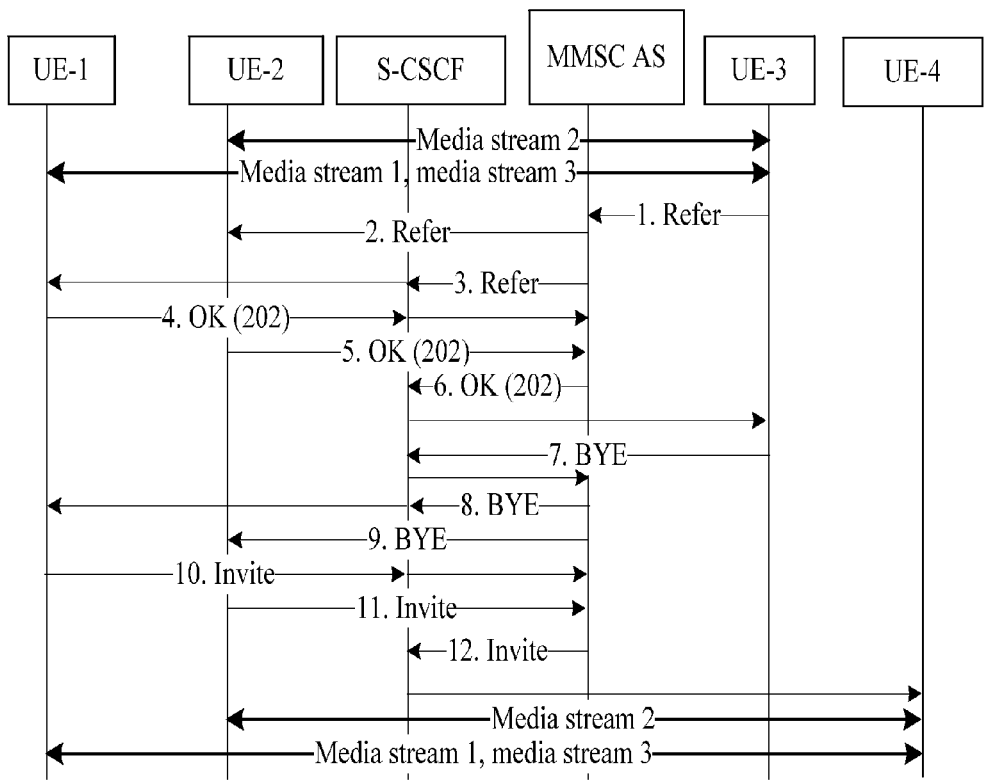
FIG. 1 is a flowchart of a call transfer method in a session between multiple UEs and a peer in the prior art.
Figure 2:
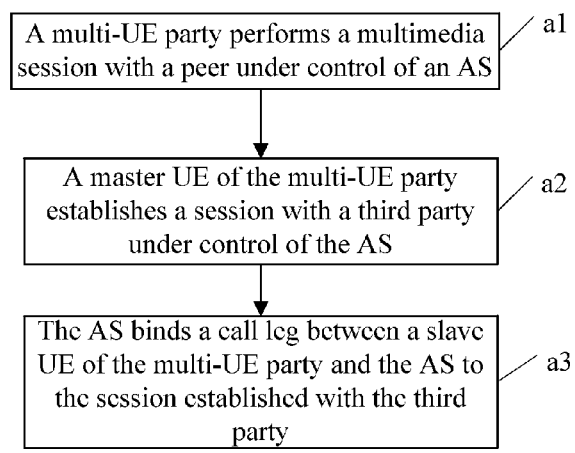
FIG. 2 is a flowchart of a multimedia session call control method in a first embodiment of the present invention.

A multimedia session call control method is provided. As shown in FIG. 2, the method includes the following steps:

a1. A multi-UE party performs a multimedia session with a peer under control of an AS.

In this embodiment, the multi-UE party may perform a session with the peer under control of the AS according to the prior art. The AS is an MMSC AS or another AS with the B2BUA functions.

a2. The master UE of the multi-UE party establishes a session with a third party under control of the AS.

It is understandable that the master UE may be differentiated from the slave UE in many ways. For example, at the time of subscription, a UE is specified as a master UE and other UEs are specified as slave UEs; or, at the time of establishing the multimedia session, the UE that joins the session first is the master UE, and the UEs that join the session later are slave UEs; or, the AS may select a random PS access terminal as a master UE. The UE control capabilities may be allocated in multiple modes, which do not constitute limitations to the present invention.

Nevertheless, the master UE in the present invention is generally a PS UE. Currently, the Media Gateway Control Function (MGCF) for signaling conversion between the Circuit Switched (CS) domain and the PS domain is unable to convert certain control signaling. Therefore, the CS UE is currently not suitable for acting as a master UE. With the improvement of the MGCF in the future, it is practicable to use the CS UE as a master UE. The major concern is that the AS can differentiate the master UE from the slave UE in multiple modes according to preset rules. The specific differentiation modes do not constitute limitations to the present invention.

It is understandable that the session established between the master UE and the third party may be initiated by the master UE or the third party. The third party may be a UE, or an access network that covers the UE, or a server, for example, a conference center.

If the session is initiated by the master UE, the process of establishing a session between the AS and the third party may include the following steps:

The master UE and the AS send an Invite message carrying the address of the third party;

The AS acts as a B2BUA, terminates the session, and regenerates an Invite message and sends it to the third party;

The third party receives the Invite message, and returns a 200 OK message to accept the invitation;

The AS receives the 200 OK message, and a call leg is established between the AS and the third party. The AS sends a 200 OK message to the third party, and a call leg is established between the AS and the master UE.

In the whole call establishment process, the AS acts as a B2BUA to maintain the signaling connection with the master UE and the third party, and bind the call leg between the AS and the master UE to the call leg between the master UE and the third party. "Bind" refers to maintaining the trigger relation of the signaling sent by both parties. For example, if receiving an Invite message from the master UE that invites the third party to join a session, the AS generates a new Invite message and sends it to the third party; if receiving a 200 OK message returned by the third party, the AS sends the 200 OK message to the master UE. The process is known as "anchoring".

The third party may be a UE, or an access network that covers the UE, or a server such as a conference center.

a3. The AS binds the call leg between the slave UE of the multi-UE party and the AS to the session established with the third party.

After step a3, the AS binds the call leg trigger relation between the slave UE of the multi-UE party and the AS to the call leg between the AS and the third party. The multi-UE party and the third party can update the media information of the peer reciprocally through the bound call leg, negotiate the media information between the master UE and the third party, and establish a connection of the media streams at the media layer.

It is understandable that the UEs of the multi-UE party include PS UEs and CS UEs.

If the slave UE of the multi-UE party is a CS UE, the PS UE is the master UE because the CS UE is unable to receive the Refer message from the AS.

The process of updating the PS UE media information is implemented through the MGCF, as detailed below:

The MGCF performs media negotiation with the third party in place of the CS UE of the multi-UE party.

After completion of the negotiation, the CS UE of the multi-UE party establishes a media connection with the third party according to the negotiated media information.

In this embodiment, the call transfer may be initiated by the peer. That is, before step a2, the AS receives a Refer message from the peer, and sends the Refer message to the multi-UE party, where the Refer message carries the address of the third party of the call transfer.

It is understandable that the multi-UE party may be notified of call transfer initiated by the peer through a Refer message or a Notify message. The major concern herein is the content carried in the message, and the specific message name and the message format do not constitute any limitation to the present invention.

Afterward, the multi-UE party may establish a session with the third party according to the third-party address obtained from the Refer message.

The AS may send the Refer message to the multi-UE party in this way: Through the PS call leg between the AS and the multi-UE party, the Refer message is sent to the master UE of the multi-UE party. In the prior art, when the AS receives the Refer message from the peer, the Refer message is split into two Refer messages, which are sent to the PS UE and the CS UE of the multi-UE party respectively. In fact, the Refer message sent to the CS UE in the prior art fails to reach the destination. After this Refer message arrives at the MGCF, the MGCF is unable to interpret it, and hence reports error information to the AS. By comparison. In the embodiments of the present invention, the call transfer message is sent to the master UE of the multi-UE party directly, where the master UE is a PS UE. Compared with the prior art, this embodiment simplifies the signaling, removes the redundant signaling flow, and makes the technical solution under the present invention simpler and more appropriate.

After the AS sends the Refer message to the multi-UE party, the method further includes:

If the multi-UE party returns an acknowledgement of the Notify message to the AS, the AS releases the call leg between the AS and the peer; and the AS releases the call leg between the AS and the master UE of the multi-UE party.

According to the first embodiment of the present invention, in the multimedia session established between the multi-UE party and the third party, part of the existing call legs are reused. By contrast, in the prior art, a multimedia session needs to be reconstructed to implement call transfer. Therefore, the embodiments of the present invention simplify the signaling flow of call transfer, shorten the call transfer time, and improve the system processing efficiency.

It is understandable to those skilled in the art that all or part of the steps of the foregoing embodiment may be implemented by hardware instructed by a program. The program may be stored in a computer-readable storage medium. When being executed, the program performs at least the following steps:

The multi-UE party performs a multimedia session with a peer under control of an AS.

A master UE of the multi-UE party establishes a session with a third party under control of the AS.

The AS binds a call leg between a slave UE of the multi-UE party and the peer to the session established with the third party.

The storage medium may be a Read-Only Memory (ROM), a magnetic disk, or a compact disk.

If the third party in the first embodiment of the present invention is a conference center, the method comes in two scenarios. The first scenario is:

Before step a2:

The peer interacts with the conference center to establish a conference.

The peer sends a Refer message to the conference center, where the Refer message carries the address of the multi-UE party and the ID of the call leg between the AS and the peer.

Step a2 includes:

The conference center sends an Invite message to the AS, where the Invite message carries the address of the multi-UE party and the ID of the call leg.

The AS modifies the ID of the call leg in the Invite message to the ID of the call leg between the AS and the master UE of the multi-UE party, and sends the modified Invite message to the master UE;

The master UE accepts the invitation, and returns an OK message to the AS, and the AS returns the OK message to the conference center.

After step a2:

The master UE releases the call leg indicated by the received call leg ID.

The second scenario is specific to the conference initiated by the multi-UE party.

After step a3:

The master UE of the multi-UE party sends a Refer message to the conference center. The Refer message carries the address of the peer and the ID of the call leg between the master UE and the AS, and is routed to the AS.

The AS modifies the ID of the call leg in the Refer message to the ID of the call leg between the AS and the peer, and sends the Refer message to the conference center.

The conference center sends an Invite message to the peer, where the Invite message carries the ID of the call leg between the AS and the peer.

The peer returns an OK message to accept the invitation.

The peer releases the session of the call leg indicated by the ID of the call leg between the AS and the peer.

In the first scenario and the second scenario described above, a conference is established through interaction between the peer and the conference center, and the conference center invites the multi-UE party to the conference. Therefore, after the multi-UE party and the peer join the conference, the multi-UE party may talk with the peer through the conference. Disconnecting the call between the multi-UE party and the peer may release more resources and reduce the network load.

As described above, in the case that the third party is a conference center, the AS modifies the call leg ID, and disconnects the call between the multi-UE party and the peer after the multi-UE party and the peer join the conference.

It is understandable that the modification of the call leg ID is also applicable to the following scenarios:

Before the master UE of the multi-UE party establishes a session with the third party under control of the AS:

The peer sends a Refer message to the third party, where the Refer message carries the address of the multi-UE party and the ID of the call leg between the AS and the peer.

The master UE of the multi-UE party establishes a session with the third party under control of the AS in the following way:

The third party sends an Invite message to the AS, where the Invite message carries the address of the multi-UE party and the ID of the call leg.

The AS modifies the ID of the call leg in the Invite message to the ID of the call leg between the AS and the master UE of the multi-UE party, and sends the modified Invite message to the master UE.

The master UE accepts the invitation, and returns an OK message to the AS, and the AS returns the OK message to the third party.

After the master UE of the multi-UE party establishes a session with the third party under control of the AS, the master UE releases the session of the call leg indicated by the received call leg ID, namely, releases the session between the master UE and the peer.

Second Embodiment

Figure 3:
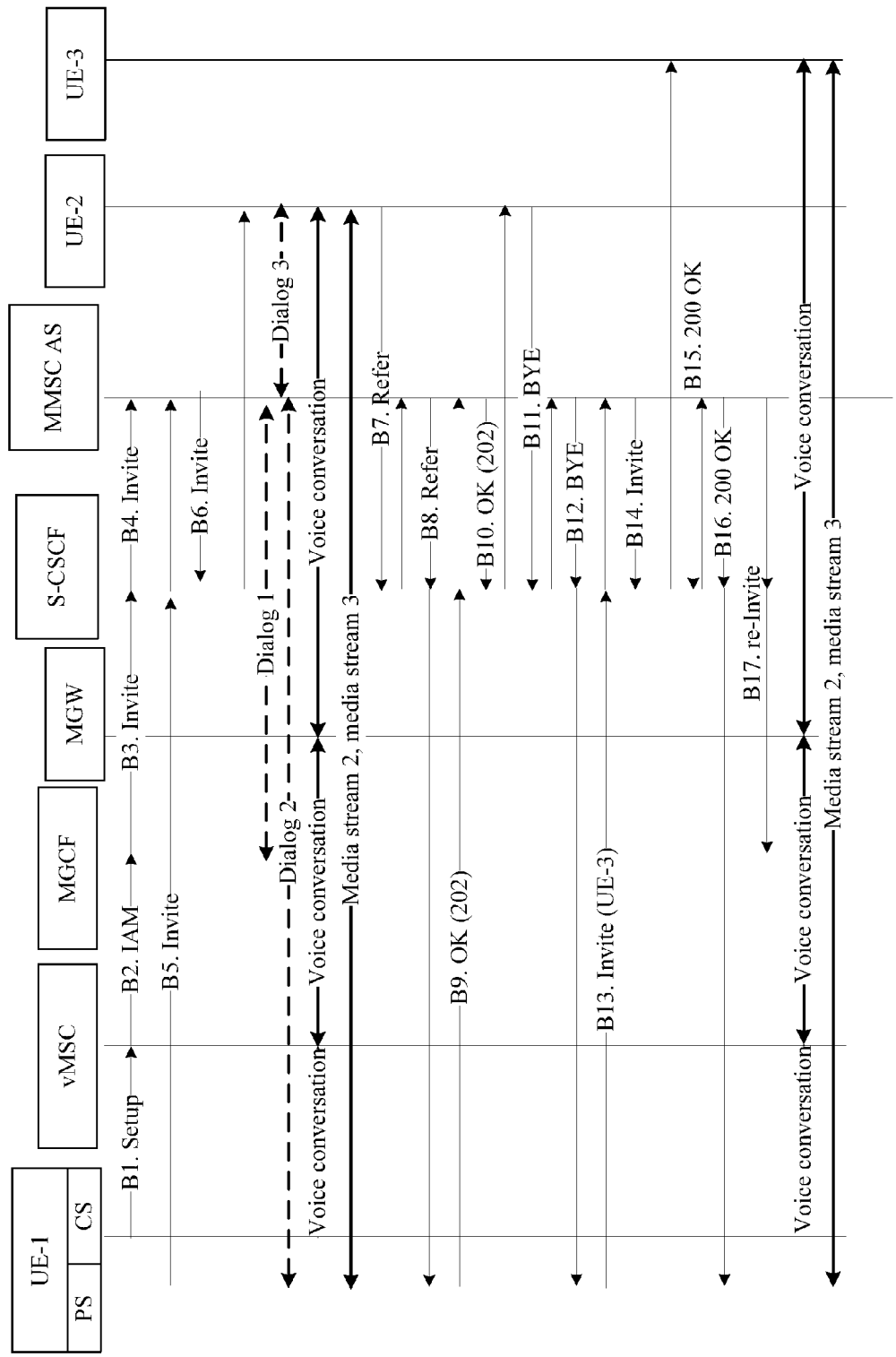
FIG. 3 is a signaling flowchart of a multimedia session call control method in a second embodiment of the present invention.

A multimedia session call control method is provided in this embodiment. The signaling flow of the method is shown in FIG. 3. The method in the second embodiment applied in a specific scenario is detailed below:

In this embodiment, the multi-UE party uses a dual-mode UE capable of accessing a CS network and a PS network simultaneously. This UE is equivalent to a CS UE integrated with a PS UE.

B1. UE-1 initiates an Invite message to UE-2 through an Establishment message in the CS network of a Universal Mobile Telecommunications System (UMTS). This message arrives at the visited Mobile Switching Center (vMSC) first.

B2. The vMSC converts the message into an Initial Address Message (IAM), and sends it to the MGCF.

B3. The MGCF converts the CS signaling into a Session Initiation Protocol (SIP) Invite message, and sends the message to the S-CSCF of UE-1.

B4. The S-CSCF of UE-1 sends the message to the MMSC AS of UE-1 for anchoring.

B5. UE-1 initiates an Invite message to UE-2 through the PS network of the UMTS. The Invite message arrives at the S-CSCF of UE-1 first, and the S-CSCF sends the message to the MMSC AS for anchoring.

Steps B1-B4 and step B5 may occur simultaneously, and are not sequence-sensitive.

B6. The MMSC AS integrates the PS calls and the CS calls of UE-1, and then sends the calls to UE-2 on the peer side.

Steps 1-6 complete the process of call establishment between UE-1 and UE-2. In FIG. 3, the dotted line indicates the dialog relation; dialog 1 and dialog 2 are anchored at the MMSC AS; the dialog between the MMSC AS and UE-2 is dialog 3; and the solid line indicates the media stream transmission state after the session is established.

B7. UE-2 sends a Refer message to UE-1. The address of the Refer-To header of the message is the SIP Uniform Resource Identifier (URI) of UE-3, and the Refer message arrives at the MMSC AS first.

UE-2 transfers the multimedia session between UE-2 and UE-1 to UE-3. That is, an ECT supplementary service is implemented. The ECT is implemented through a SIP Refer message.

B8. After receiving the Refer message, the MMSC AS splits the media, and sends the Refer message to UE-1 through the leg in the PS domain.

B9. UE-1 returns a 202 OK message from the PS leg.

B10. According to the anchoring information, the MMSC AS generates a new 202OK message and sends it to UE-2.

B11. After receiving the OK message, UE-2 sends a BYE message to UE-1. The BYE message arrives at the MMSC AS first.

B12. According to the anchoring information, the MMSC AS splits the BYE message, and sends the BYE message to the PS leg of UE-1.

B13. UE-1 initiates an Invite message to UE-3 from the PS leg. The Invite message arrives at the MMSC AS through the S-CSCF.

B14. After receiving the Invite message, the MMSC AS generates new anchoring information. Under control of the MMSC AS, the old CS signaling leg is added to the new anchoring information, and the PS media information of UE-1 and the media information of the Media Gateway (MGW) are integrated and then sent to UE-3. B15. UE-3 returns a 200 OK message. This message carries media information, namely, IP address and port number, of UE-3.

B16. According to the anchoring information, the MMSC AS sends the 200 OK message to UE-1.

B17. The MMSC AS sends a re-Invite/Update message to the MGCF. This message carries UE-3 media information and instructs the MGW to establish a media connection with UE-3.

In this embodiment, the PS part may be separated from the CS part of UE-1 to form two UEs, which does not affect the implementation of the method in this embodiment.

Third Embodiment

Figure 4:
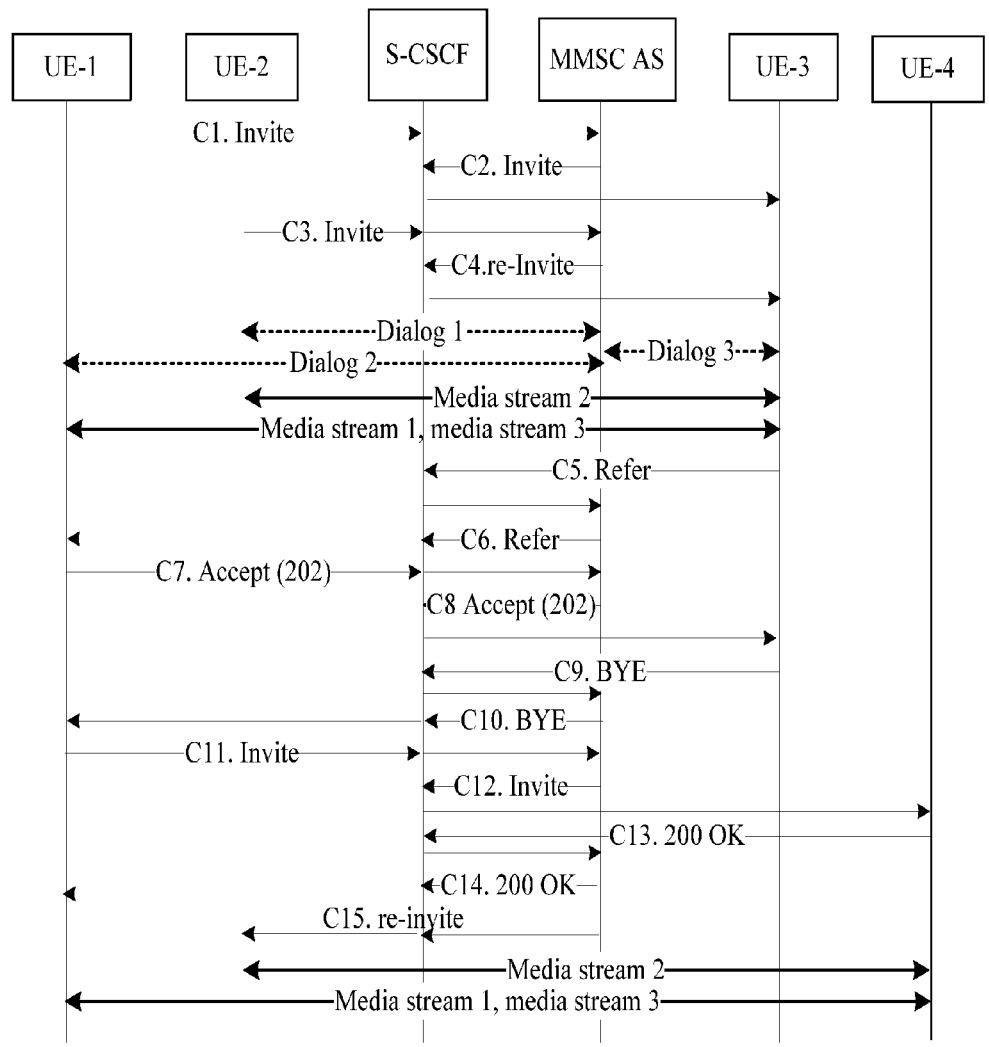
FIG. 4 is a signaling flowchart of a multimedia session call control method in a third embodiment of the present invention.

A multimedia session call control method is provided in this embodiment. The signaling flow of the method is shown in FIG. 4. The method in the third embodiment applied in a specific scenario is detailed below:

In this embodiment, the multi-UE party is composed of two PS UEs. It is understandable that the multi-UE party may be composed of more UEs. The number of UEs of the multiple-UE party does not constitute any limitation to the present invention.

C1. UE-1 initiates an Invite message to UE-3. Through the S-CSCF, the Invite message arrives at the MMSC AS for anchoring. The Invite message carries three types of media: voice, video, and text.

C2. The MMSC AS generates a new Invite message and sends it to UE-2.

C3. UE-1 decides to transfer the second channel of media to UE-2. UE-2 initiates an Invite message to the AS. The Session Description Protocol (SDP) media line information of the Invite message is "video". The MMSC AS anchors the Invite message, and adds the Invite message to the multimedia session between UE-1 and UE-3.

C4. The MMSC AS sends an Update message to UE-3, instructing UE-3 to connect the second channel of media to UE-2.

Note 1: Steps 1-4 implement multimedia connections between UE-1, UE-2, and UE-3. In FIG. 4, the dotted line indicates the dialog relation; dialog 1 and dialog 2 are anchored at the MMSC AS; and the dialog between the MMSC AS and UE-3 is dialog 3.

In this embodiment, UE-1 is a master UE, and UE-2 is a slave UE. UE-3 transfers the multimedia session between UE-3 and UE-1 as well as the multimedia session between UE-3 and UE-2 to UE-4. That is, an ECT supplementary service is implemented. The ECT is implemented through a SIP Refer message.

C5. UE-3 sends a Refer message. The address of the Refer-To header of the message is the SIP URI of UE-4, and the Refer message arrives at the MMSC AS first.

C6. After receiving the Refer message, the MMSC AS splits the media, and sends the Refer message only to UE-1.

C7. UE-1 returns a 202 OK message.

C8. According to the anchoring information, the MMSC AS generates a new 202 OK message and sends it to UE-3.

C9. After receiving the OK message, UE-3 sends a BYE message. The BYE message arrives at the MMSC AS first.

C10. According to the anchoring information, the MMSC AS splits the BYE message, and sends the BYE message to UE-1.

C11. UE-1 sends a new Invite message to UE-4. This message arrives at the MMSC AS through the S-CSCF.

C12. After receiving the Invite message, the MMSC AS generates new anchoring information. Under control of the MMSC AS, the signaling of UE-2 is added to the new anchoring information, and the media information of UE-1 and the media information of UE-2 are integrated and then sent to UE-4.

C13. UE-4 returns a 200 OK message. This message carries media information, namely, IP address and port number, of UE-4.

C14. The MMSC AS sends a 200 OK message to UE-1 according to the anchoring information. This message carries media information of UE-4.

C15. The MMSC AS sends a re-Invite/Update message to UE-2. This message carries UE-4 media information and instructs UE-2 to connect to UE-4.

The third embodiment differs from the second embodiment in that the two UEs of the multi-UE party in the third embodiment are PS UEs.

It is understandable that in the second embodiment and the third embodiment of present invention, the third party may be a conference center, and that the multi-UE party may interact with the conference center to create a conference or join a conference.

Fourth Embodiment

Figure 5:
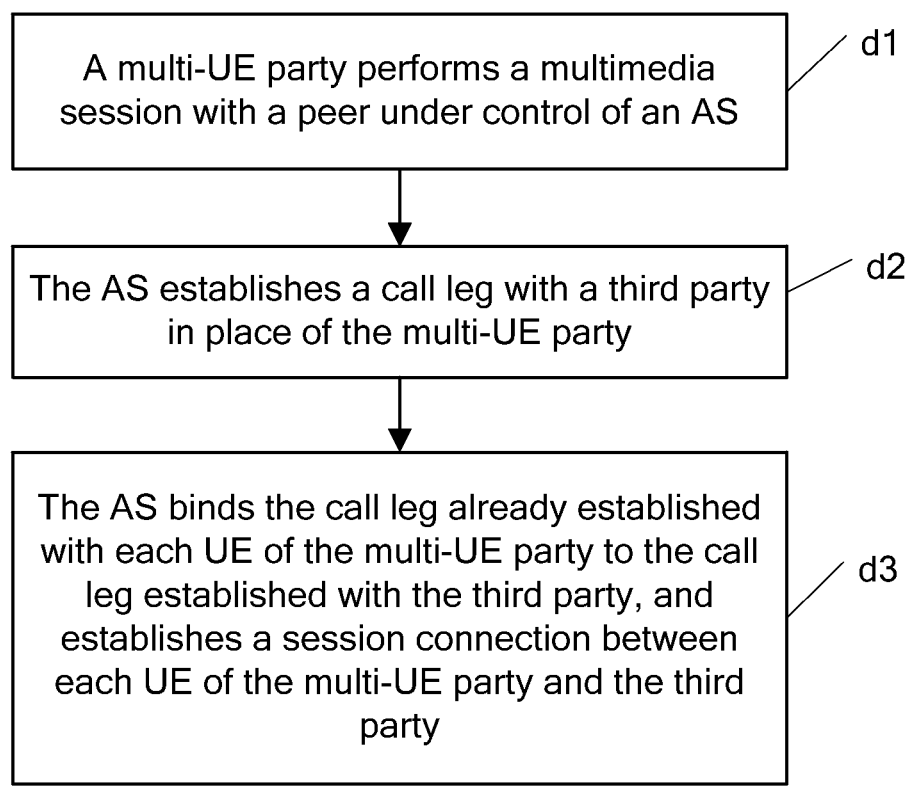
FIG. 5 is a flowchart of a multimedia session call control method in a fourth embodiment of the present invention.

A multimedia session call control method is provided. As shown in FIG. 5, the method includes the following steps:

d1. The multi-UE party performs a multimedia session with the peer under control of the AS.

The multi-UE party may be composed of PS UEs and CS UEs, or composed of PS UEs only. A multi-UE party may include one or more UEs.

d2. The AS establishes a call leg with a third party in place of the multi-UE party.

The call leg established between the AS and the third party is initiated by the AS or the third party.

The third party may be a UE, or an access network that covers the UE, or a server such as a conference center.

d3. The AS binds the call leg already established with each UE of the multi-UE party to the call leg established with the third party, and establishes a session connection between each UE of the multi-UE party and the third party.

In this embodiment, before step d2, the method may include the following steps: The AS receives the Refer message from the peer, where the Refer message carries the address of the third party of the call transfer; the AS sends the Refer message to the multi-UE party; if receiving an OK message returned from the multi-UE party, the AS sends the OK message to the peer; the peer receives the OK message and releases the call leg between the peer and the AS.

The fourth embodiment differs from the first embodiment in that: In the multimedia session established between the multi-UE party and the third party, all of the existing call legs are reused, thus simplifying the signaling flow of call transfer, shortening the call transfer time, and improving the system processing efficiency.

Fifth Embodiment

Figure 6:
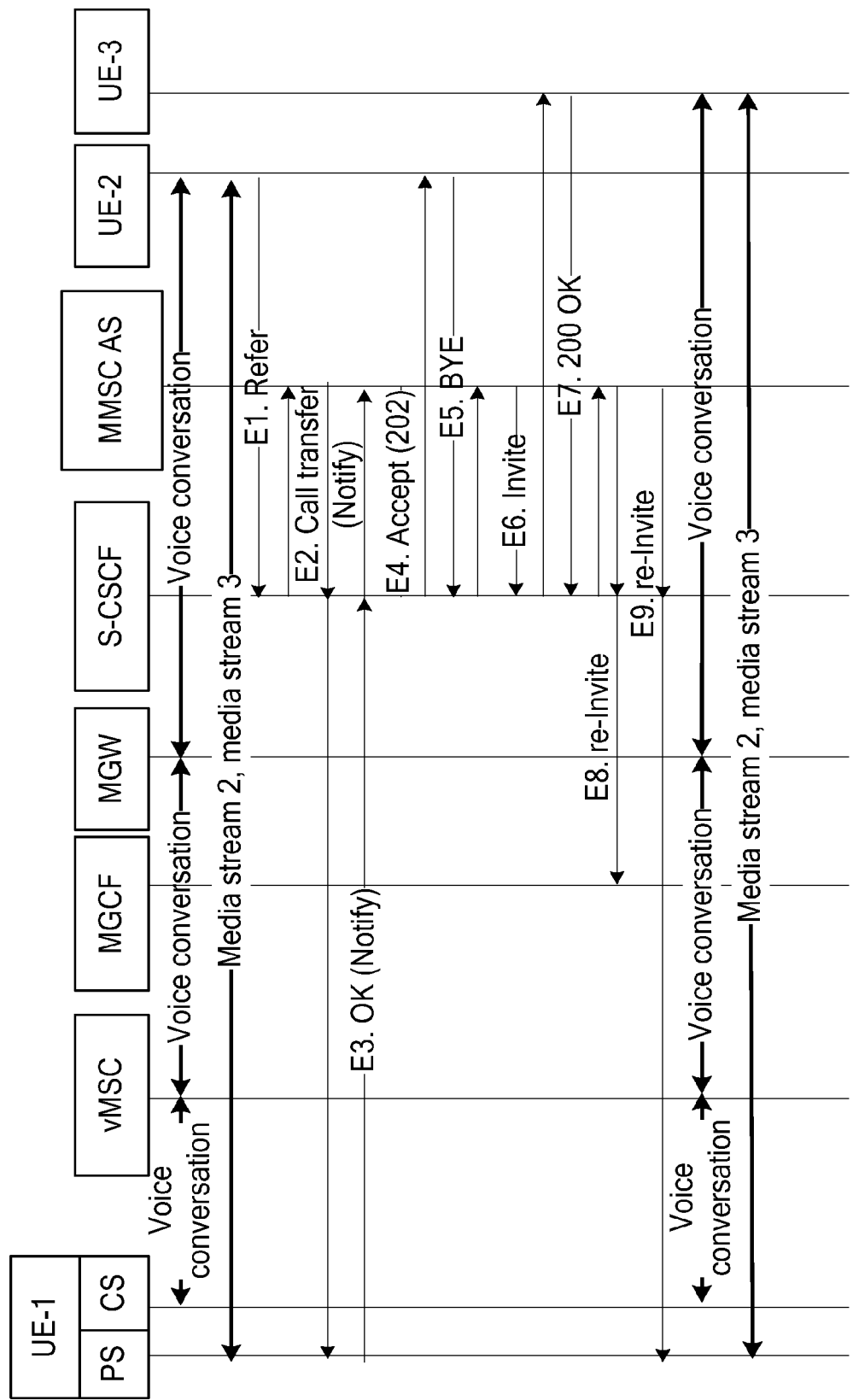
FIG. 6 is a signaling flowchart of a multimedia session call control method in a fifth embodiment of the present invention.

A multimedia session call control method is provided. The signaling flow is shown in FIG. 6. This embodiment supposes that the multimedia session between the local UE-1 and the peer UE-2 is established successfully; the session involves three types of media streams: voice, video, and text. The multi-UE party UE-1 uses a dual-mode UE capable of accessing the CS network and the PS network simultaneously. The voice streams are transmitted in the CS network of the UMTS, and the remaining two types of media streams are transmitted in the PS network of the UMTS.

In FIG. 6, the S-CSCF and the AS are network devices that serve UE-1. FIG. 6 does not illustrate the S-CSCF or the AS corresponding to UE-2 and UE-3.

The process of establishing a call between UE-1 and UE-2 is the same as steps 1-6 in the second embodiment. It is understandable that the specific process of establishing a call between UE-1 and UE-2 may be implemented in many ways based on the prior art, and does not constitute any limitation to the present invention.

In this embodiment, UE-2 transfers the multimedia session between UE-2 and UE-1 to UE-3. That is, an ECT supplementary service is implemented. The ECT is implemented through a SIP Refer message.

E1. UE-2 sends a Refer message to UE-1. The address of the Refer-To header of the message is the SIP URI of UE-3, and the Refer message arrives at the MMSC AS first.

E2. The MMSC AS sends a notification message (for example, Notify, or Info) to UE-1. This message notifies UE-1 hat the peer is expected to perform an ECT supplementary service.

E3. If accepting the supplementary service, the peer returns an OK message. If the peer refuses the supplementary service, the conversation between UE-1 and UE-2 goes on, without subsequent steps.

E4. The MMSC AS sends a 202 OK message to UE-2 in place of UE-1.

E5. After receiving the OK message, UE-2 sends a BYE message to UE-1, thus cutting off the signaling and multimedia connection with UE-1.

E6. The MMSC AS sends an Invite message to a third-party UE-3 in place of UE-1.

E7. The third-party UE-3 returns a 200 OK message. This message carries media information, namely, IP address and port number, of UE-3.

E8. The MMSC AS sends a re-Invite/Update message to the MGCF. This message carries UE-3 media information and instructs the MGW to establish a media connection with UE-3.

E9. The MMSC AS sends a re-Invite/Update message to the PS leg of UE-1. This message carries UE-3 media information and instructs UE-1 to establish a media connection with UE-3.

Sixth Embodiment

Figure 7:
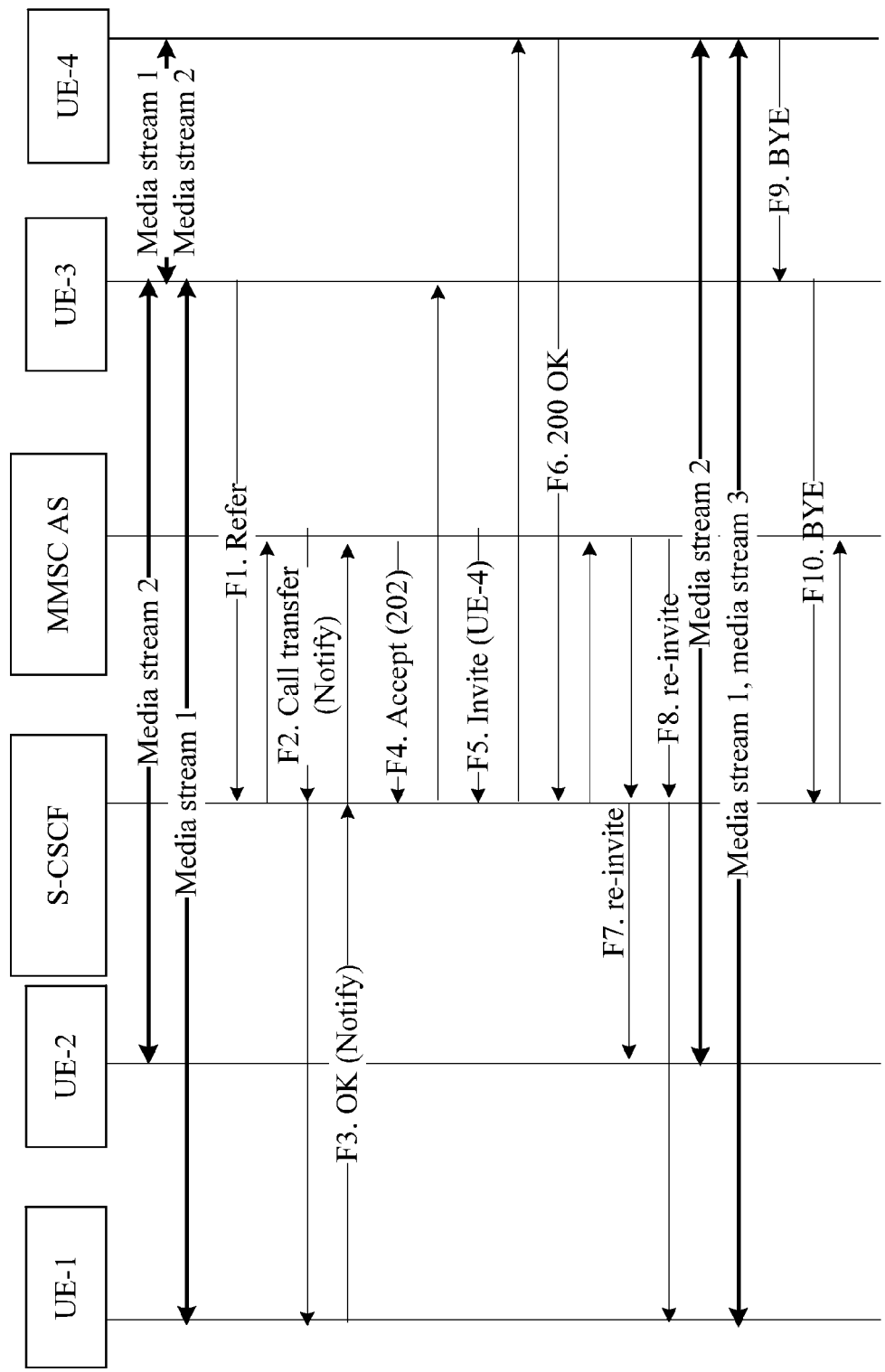
FIG. 7 is a signaling flowchart of a multimedia session call control method in a sixth embodiment of the present invention.

A multimedia session call control method is provided. The signaling flow of the method is shown in FIG. 7. The method in the sixth embodiment of the present invention applied in a specific scenario is detailed below.

In this embodiment, the multi-UE party is composed of two PS UEs. It is understandable that the multi-UE party may be composed of more UEs. The number of UEs of the multiple-UE party does not constitute any limitation to the present invention.

The process of establishing a call between UE-1 and UE-2 is the same as steps 1-4 in the third embodiment. It is understandable that the specific process of establishing a call between UE-1 and UE-2 may be implemented in many ways based on the prior art, and does not constitute any limitation to the present invention.

In this embodiment, UE-3 transfers the multimedia session between UE-3 and UE-1 and the multimedia session between UE-3 and UE-2 to UE-4. That is, an ECT supplementary service is implemented. The ECT is implemented through a SIP Refer message.

F1. UE-3 sends a Refer message. The address of the Refer-To header of the message is the SIP URI of UE-4; the Replace header of the message is the dialog ID of the dialog between UE-3 and UE-4; and the Refer message arrives at the MMSC AS first.

F2. The MMSC AS sends a notification message (for example, Notify, or Info) to UE-1. This message notifies UE-1 that the peer is expected to perform an ECT supplementary service.

F3. If accepting the supplementary service, the peer returns an OK message, and proceeds to step F4. If refusing the supplementary service, the peer goes on with the existing multimedia session, without performing the subsequent steps.

F4. The MMSC AS returns a 202 OK message in place of UE-1 and UE-2.

F5. The MMSC AS initiates an Invite message to UE-4 in place of UE-1 and UE-2. This message carries media information, namely, IP address and port number, of UE-1 and UE-2.

F6. UE-4 returns a 200 OK message. This message carries media information, namely, IP address and port number, of UE-4.

F7-F8. The MMSC AS sends a re-Invite/Update message to UE-1 and UE-2 respectively according to the anchoring information. This message carries UE-4 media information.

F9. After establishing a call with UE-1 and UE-2 successfully, UE-4 sends a BYE message to UE-3.

F10. UE-3 sends a BYE message, and the MMSC AS terminates the BYE message.

The scenario in which the third party is a conference center is detailed below.

Seventh Embodiment

Figure 8:
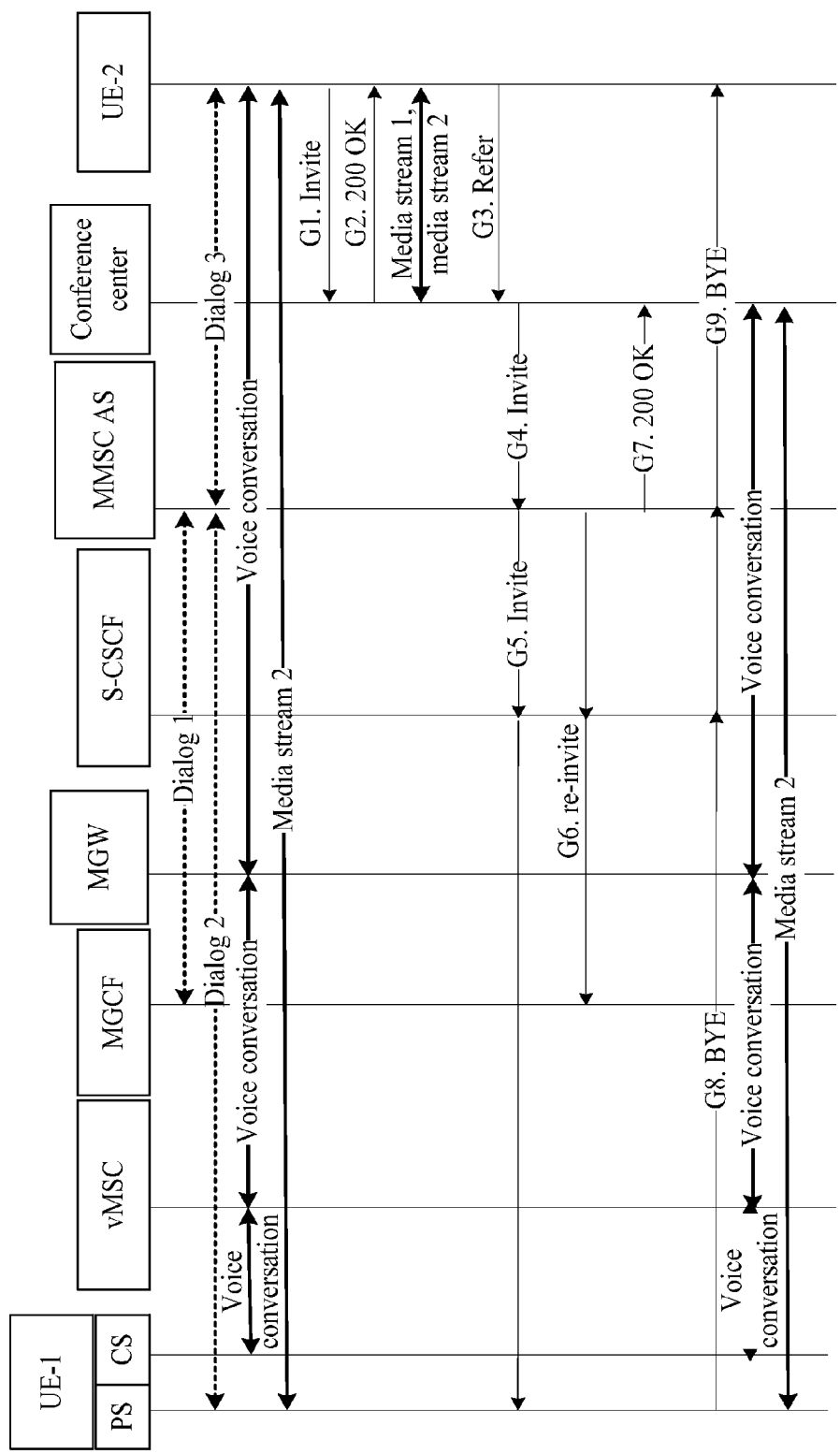
FIG. 8 is a signaling flowchart of a multimedia session call control method in a seventh embodiment of the present invention.

A multimedia session call control method is provided. The signaling flow of the method is shown in FIG. 8. In this embodiment, the multi-UE party is UE-1; UE-1 is a dual-mode UE; the PS part of the UE may access the PS domain, and the CS part may access the CS domain. It is understandable that the multi-UE party may be a conference center.

This embodiment supposes that a multimedia session is already established between the multi-UE party (UE-1) and the peer (UE-2). This session involves two types of media streams: voice, and video. The voice streams are transmitted in the CS network, and the video streams are transmitted in the PS network.

In FIG. 8, the S-CSCF and the AS are network devices that serve UE-1. FIG. 8 does not illustrate the S-CSCF or the AS corresponding to UE-2.

The process of establishing a call between UE-1 and UE-2 in this embodiment is the same as steps A1-A6 in the second embodiment.

G1. UE-2 sends an Invite message to the conference center of the conference server. The destination address of the Invite message is a URI of the conference server.

G2. The conference server generates a new focus for the newly created conference, allocates a conference URI (Conf URI) for the new conference, and adds the Conf URI to a 200 OK message, which is then returned to UE-2.

After steps G1-G2, the connection between UE-2 and the conference center is established successfully.

G3. UE-2 sends a Refer message to the conference center. The address of the Refer-To header of the message is the SIP URI of UE-1, and the Replace header of the message is the ID of the call leg between UE-2 and the MMSC AS. In this embodiment, the Replace header is the dialog ID of dialog 3.

G4. The conference center sends an Invite message to UE-1. The Replace header of the Invite message is the dialog ID of dialog 3 between UE-2 and the MMSC AS. The Contact header of the message is the URI of the conference center, and carries an isfocus parameter. The isfocus parameter indicates that the URI carried in this message is the URI of the conference center.

G5. After receiving the Invite message from the third party (MGCF), the MMSC AS generates new anchoring information and exercises control to add the old CS signaling leg to the new anchoring information. The MMSC AS splits the media, and sends an Invite message to the PS leg of UE-1. According to the anchoring information, the MMSC AS modifies the Replace header of the Invite message in step 4 to the dialog ID of dialog 2 between the PS domain of UE-1 and the MMSC AS, and adds the Replace header to the Invite message, which is then sent to UE-1.

G6. The MMSC AS sends a re-Invite message to the CS leg of UE-1. This message carries the media information of the conference center.

G7. The MMSC AS returns a 200 OK message to the conference center. The message carries the integrated PS media information of UE-1 and the media information of the MGW.

G8. UE-1 sends a BYE message to UE-2.

G9. The MMSC AS sends a BYE message to UE-2 to release the session between UE-1 and UE-2.

Eighth Embodiment

Figure 9:
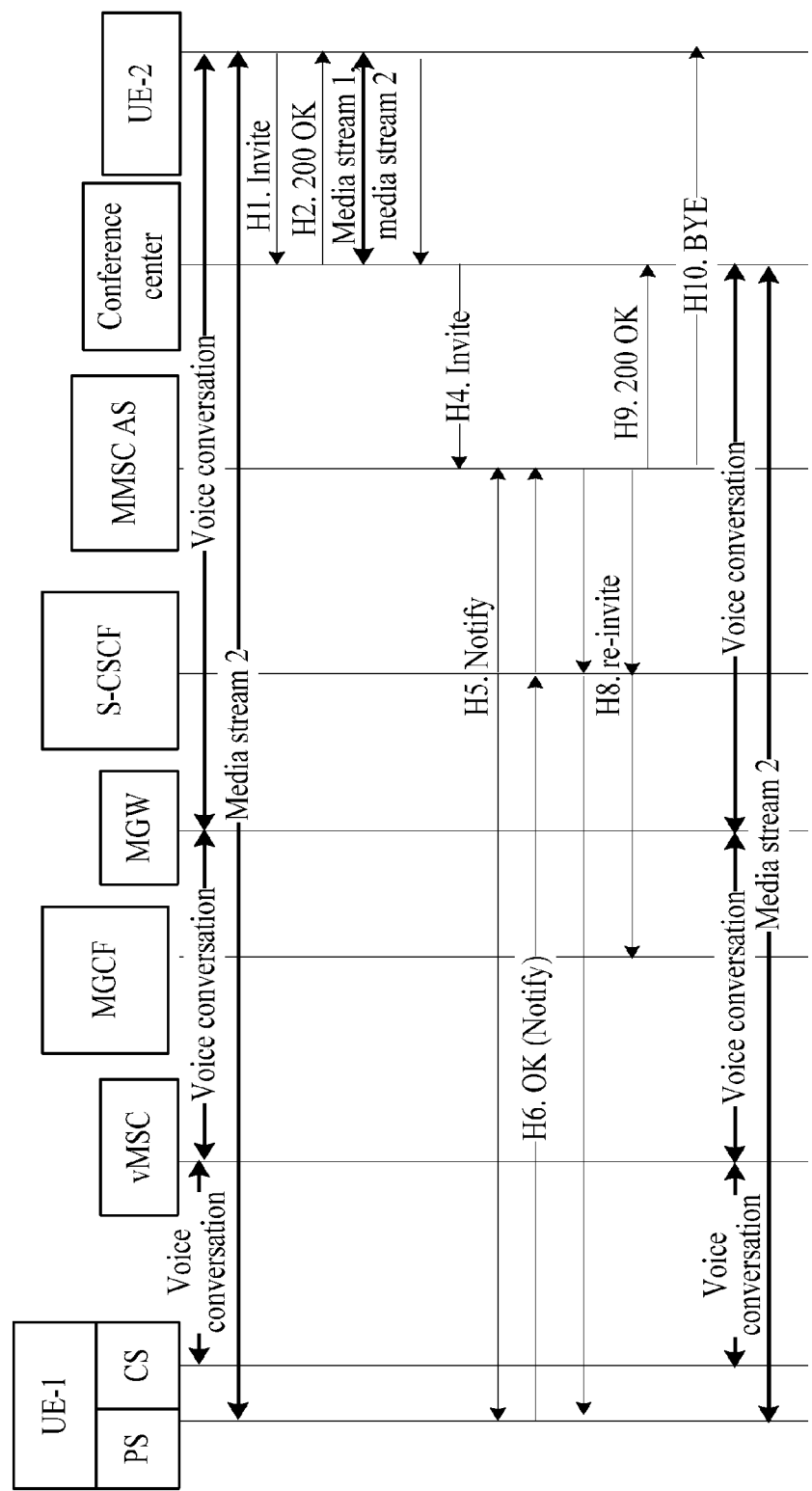
FIG. 9 is a signaling flowchart of a multimedia session call control method in an eighth embodiment of the present invention.

A multimedia session call control method is provided. The signaling flow of the method is shown in FIG. 9. In this embodiment, the multi-UE party is UE-1; UE-1 is a dual-mode UE; the PS part of the UE may access the PS domain, and the CS part may access the CS domain. It is understandable that the multi-UE party may be a conference center.

This embodiment supposes that a multimedia session is already established between the multi-UE party (UE-1) and the peer (UE-2). This session involves two types of media streams: voice, and video. The voice streams are transmitted in the CS network, and the video streams are transmitted in the PS network.

In FIG. 9, the S-CSCF and the AS are network devices that serve UE-1. FIG. 9 does not illustrate the S-CSCF or the AS corresponding to UE-2.

The process of establishing a call between UE-1 and UE-2 in this embodiment is the same as steps A1-6 in the second embodiment.

H1. UE-2 sends an Invite message to the conference center of the conference server. The destination address of the Invite message is a URI of the conference server.

H2. The conference server generates a new focus for the newly created conference, allocates a Conf URI for the new conference, and adds the Conf URI to a 200 OK message, which is then returned to UE-2.

After steps H1-H2, the connection between UE-2 and the conference center is established successfully.

H3. UE-2 sends a Refer message to the conference center. The address of the Refer-To header of the message is the SIP URI of UE-1, and the Replace header of the message is the dialog ID of the dialog between the MMSC AS and UE-2.

H4. The conference center sends an Invite message to UE-1. The Replace header of the Invite message is the dialog ID of the dialog between UE-2 and the MMSC AS. The Contact header of the message is the URI of the conference center, and carries an isfocus parameter. The isfocus parameter indicates that the URI carried in this message is the URI of the conference center.

H5. The MMSC AS sends a notification message (for example, Notify, or Info) to UE-1. This message notifies UE-1 that the third party is expected to perform a conference call.

H6. If accepting the conference call, the peer returns an OK message. If refusing the conference call, the peer goes on with the existing multimedia session, without performing the subsequent steps.

H7. The MMSC AS splits the media according to the anchoring information, and sends a re-Invite message to the PS leg of UE-1. This message carries the media information of the conference center.

H8. The MMSC AS sends a re-Invite message to the CS leg of UE-1. This message carries the media information of the conference center.

H9. The MMSC AS returns a 200 OK message to the conference center. The message carries the PS media information of UE-1 and the media information of the MGW.

H10. The MMSC AS sends a BYE message to UE-2 in place of UE-1.

Ninth Embodiment

Figure 10:
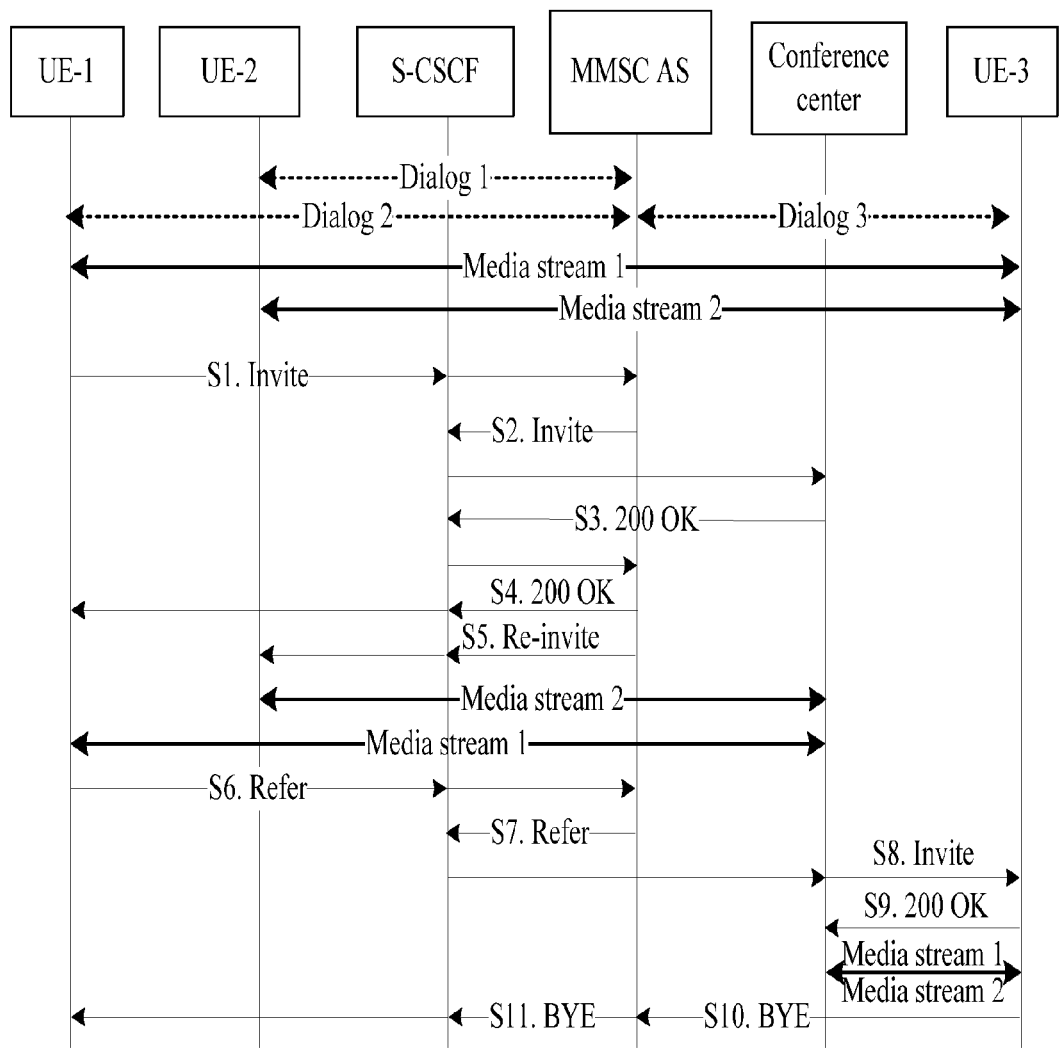
FIG. 10 is a signaling flowchart of a multimedia session call control method in a ninth embodiment of the present invention.

A multimedia session call control method is provided. The signaling flow is shown in FIG. 10. In this embodiment, the multi-UE party is composed of two PS UEs: UE-1 and UE-2.

This embodiment supposes that a multimedia session is already established between UE-1 and UE-2. This session involves two types of media streams: voice, and video. The voice streams are transmitted in the CS network, and the video streams are transmitted in the PS network.

In FIG. 10, the S-CSCF and the AS are network devices that serve UE-1. FIG. 10 does not illustrate the S-CSCF or the AS corresponding to UE-2 and UE-3.

The process of establishing a call between UE-1 and UE-2 in this embodiment is the same as steps C1-C4 in the third embodiment.

S1. UE-1 sends an Invite message to the conference center of the conference server. The destination address of the Invite message is a URI of the conference server.

S2. The MMSC AS generates new anchoring information for the message. Under control of the MMSC AS, the signaling of UE-2 is added to the new anchoring information, and the media information of UE-1 and the media information of UE-2 are integrated and then sent to the third party.

S3. The conference server generates a new focus for the newly created conference, allocates a Conf URI for the new conference, and adds the Conf URI to a 200 OK message, which is then returned. The 200 OK message carries media information of the conference center.

S4. According to the anchoring information, the MMSC AS sends the 200 OK message to UE-1.

S5. The MMSC AS sends an Update message to UE-2, and sends the media information of the MREFP to UE-2.

After steps S1-S5, the connection between UE-1 and the conference center as well as the connection between UE-2 and the conference center are established successfully.

S6. UE-1 sends a Refer message to the conference center. The address of the Refer-To header of the message is the SIP URI of UE-3, and the Replace header of the message is the dialog ID of dialog 2 between UE-1 and the MMSC AS.

S7. The MMSC AS generates a new Refer message, modifies the dialog ID of the dialog between UE-1 and the MMSC AS in the Replace header to the dialog ID of dialog 3 between the MMSC AS and UE-3, and sends the new Refer message to the conference center.

S8. According to the Refer message, the conference center sends a new Invite message to UE-3. The Replace header of the Invite message is the dialog ID of dialog 3 between UE-3 and the MMSC AS. The Contact header of the message is the URI of the conference center, and carries an isfocus parameter. The message carries media information of the conference center.

S9. UE-3 returns a 200 OK message. This message carries media information of UE-3.

After step 9, the link between UE-3 and the conference center is established successfully.

S10. UE-3 sends a BYE message.

S1. The MMSC AS sends a BYE message to UE-1.

Tenth Embodiment

Figure 11:
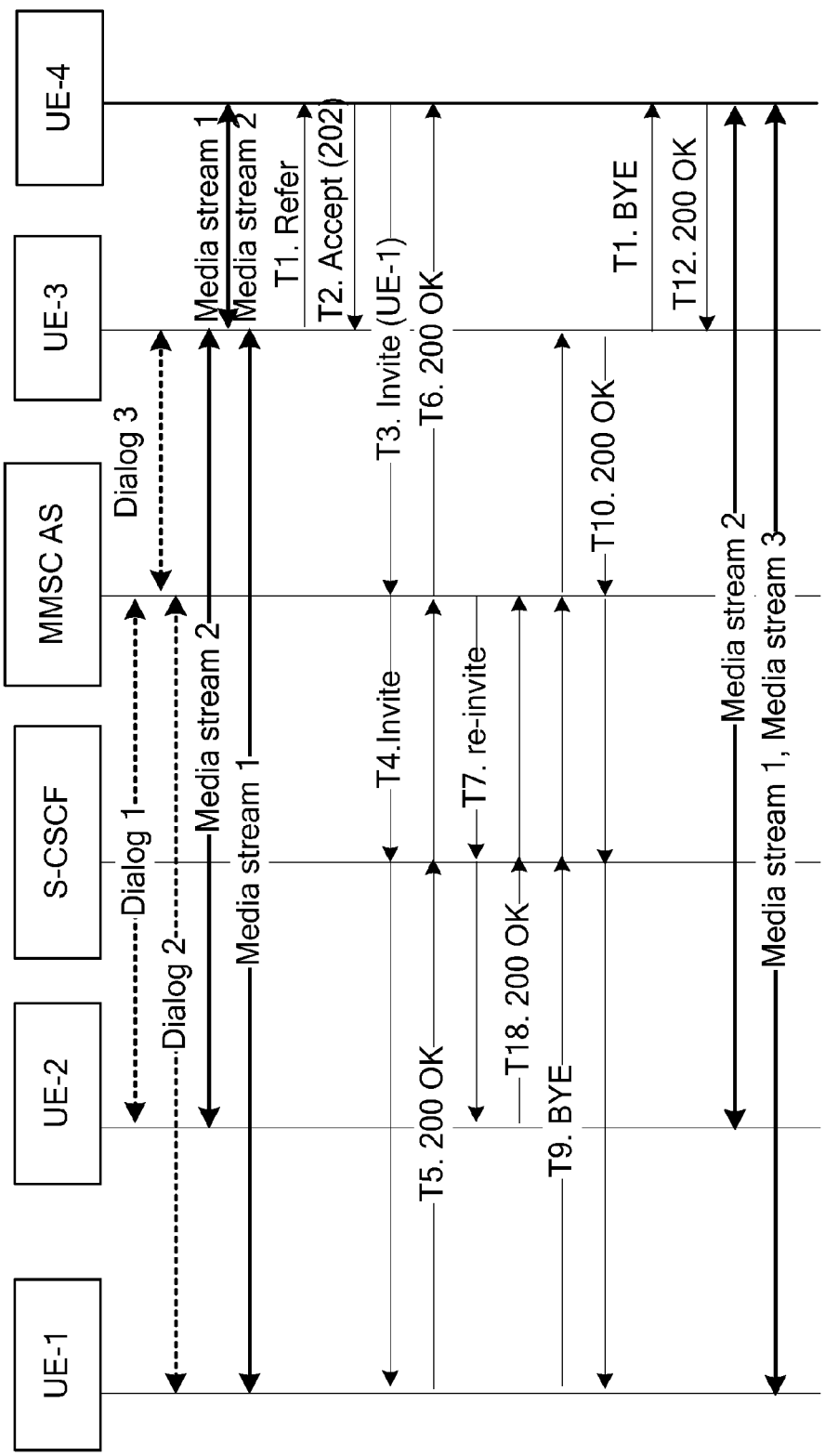
FIG. 11 is a signaling flowchart of a multimedia session call control method in a tenth embodiment of the present invention.

A call control method is provided. The signaling flow is shown in FIG. 11. This embodiment supposes that UE-1 and UE-2 are two UEs of the multi-UE party; UE-1 and UE-2 are connected to UE-3 in a session; and UE-3 is connected to UE-4 in a session.

In FIG. 11, the S-CSCF and the AS are network devices that serve UE-1. FIG. 11 does not illustrate the S-CSCF or the AS corresponding to UE-2 and UE-3.

T1. UE-3 sends a Refer message to UE-4 The address of the Refer-To header of the message is the SIP URI of UE-1, and the Replace header of the message is the dialog ID of dialog 3 between UE-3 and the MMSC AS.

T2. UE-4 returns an OK message to UE-3.

T3. UE-4 sends an Invite message to UE-1. The Replace header of the Invite message is the dialog ID of dialog 3 between UE-2 and the MMSC AS.

T4. After receiving the Invite message, the MMSC AS exercises control to bind the existing signaling leg between UE-2 and the MMSC AS to the signaling leg established in this step. The MMSC AS splits the media, and sends an Invite message to UE-1 The MMSC AS modifies the Replace header of the Invite message in step 3 to the dialog ID of dialog 2 between UE-1 and the MMSC AS, and adds the Replace header to the Invite message, which is then sent to UE-1.

T5. UE-1 returns an OK message.

T6. The MMSC AS returns an OK message to UE-4.

T7. The MMSC AS sends a re-Invite message to UE-2. This message carries the media information of UE-4.

T8. UE-2 returns an OK message.

T9. UE-1 sends a BYE message to UE-3.

T10. UE-3 returns an OK message.

T11-T12. UE-3 is disconnected from UE-4.

Eleventh Embodiment

Figure 12:
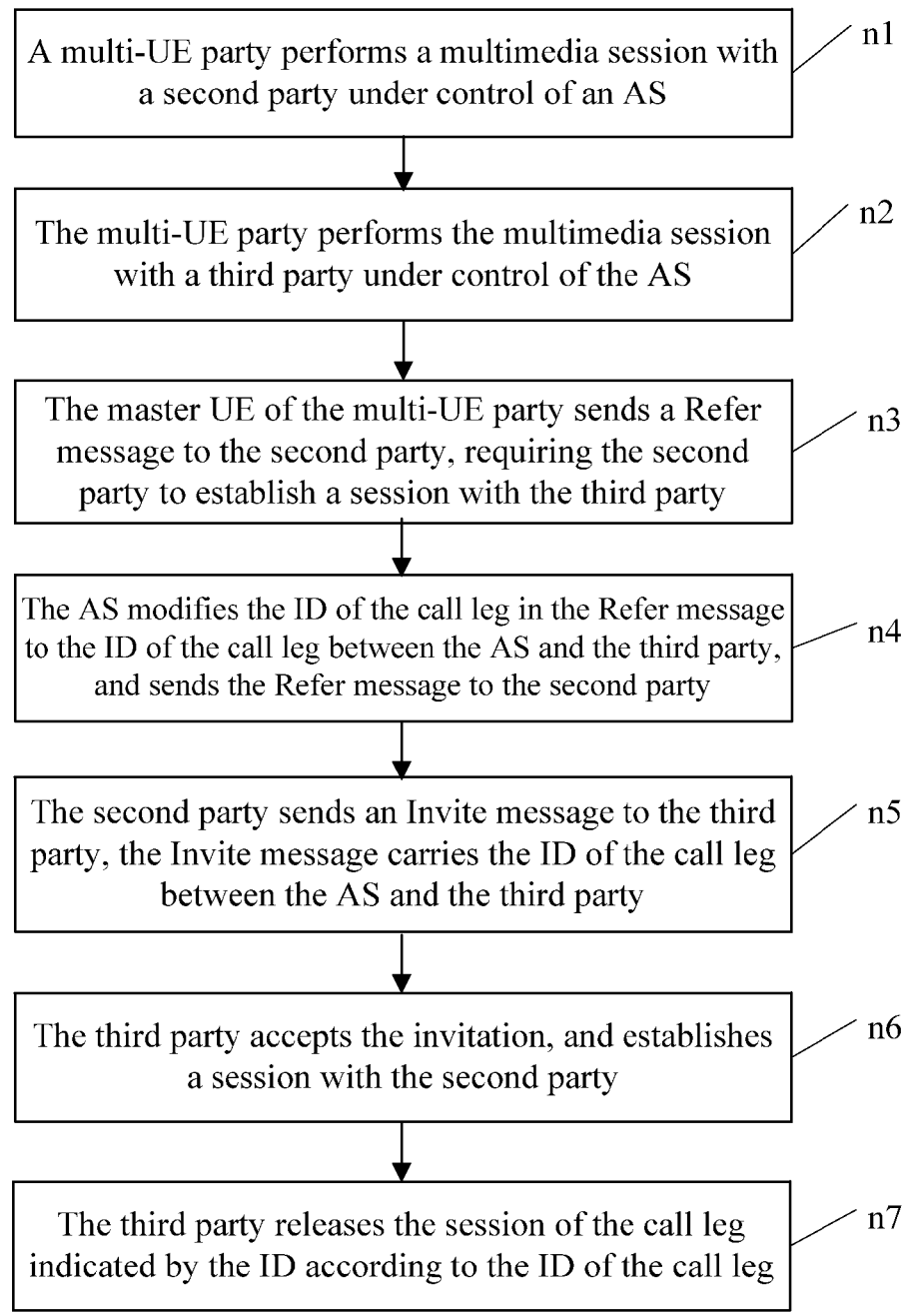
FIG. 12 is a flowchart of a multimedia session call control method in an eleventh embodiment of the present invention.

A multimedia session call control method is provided. As shown in FIG. 12, the method includes:

n1. The multi-UE party performs a multimedia session with the second party under control of the AS.

n2. The multi-UE party performs a multimedia session with the third party under control of the AS.

n3. The master UE of the multi-UE party sends a Refer message to the second party, where the Refer message requires the second party to establish a session with the third party, carries an ID of a call leg between the master UE and the AS, and is routed to the AS.

n4. The AS modifies the ID of the call leg in the Refer message to the ID of the call leg between the AS and the third party, and sends the Refer message to the second party.

n5. The second party sends an Invite message to the third party, where the Invite message carries the ID of the call leg between the AS and the third party.

n6. The third party accepts the invitation, and establishes a session with the second party.

n7. The third party releases the session of the call leg indicated by the ID according to the ID of the call leg.

In the eleventh embodiment of the present invention, the AS differentiates the master UE from the slave UE of the multi-UE party. In the call transfer process, after a Refer message is received from the second party, the ID of the call leg between the AS and the second party is modified to the ID of the master UE. Therefore, the multi-UE party can identify the session that needs to be released after the call transfer, and the ECT service supports multiple UEs and is applicable in a wider scope.

Figure 13:
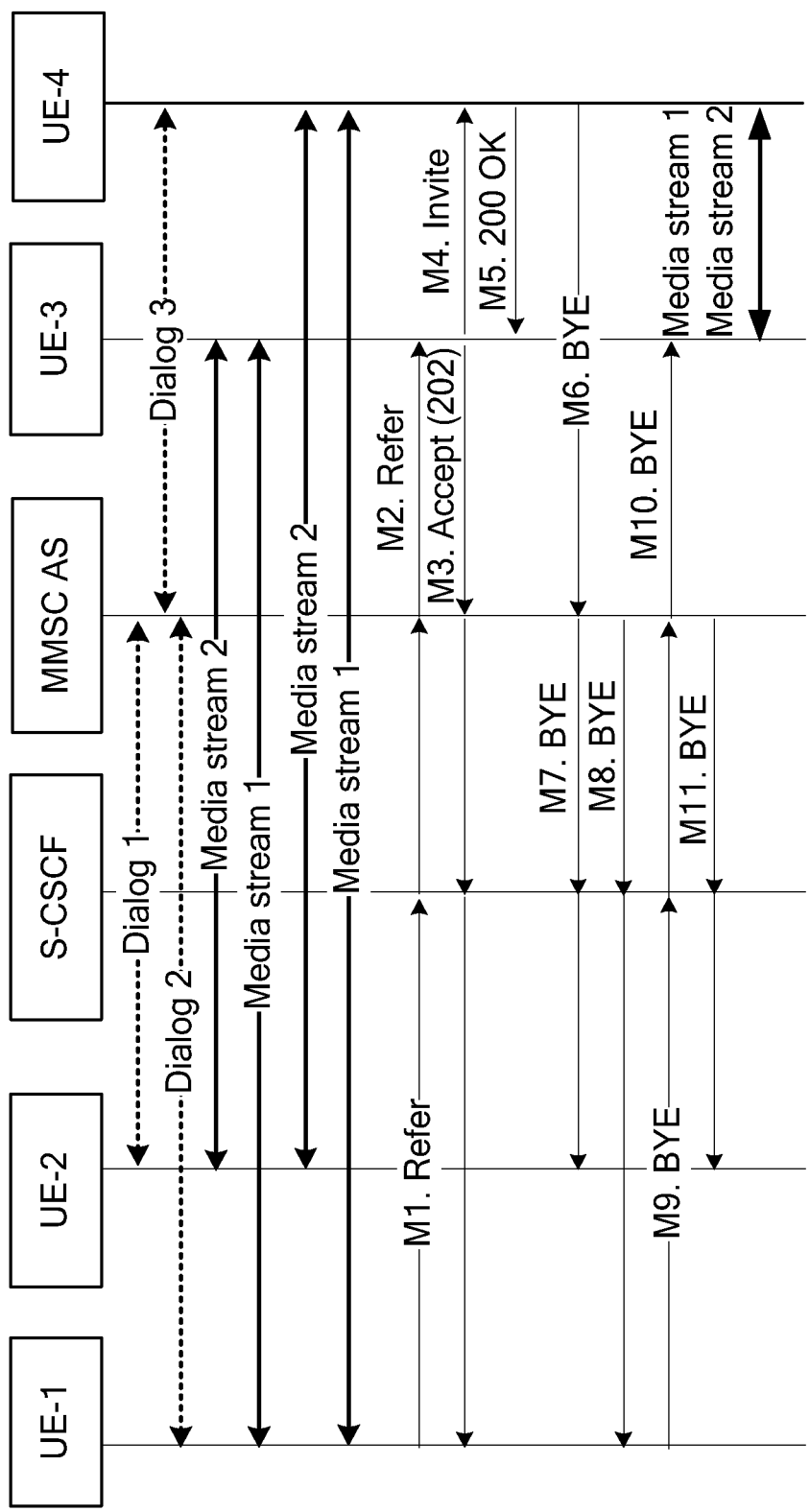
FIG. 13 is a signaling flowchart of the eleventh embodiment of the present invention.

Described below is a signaling flow of the eleventh embodiment applied in a specific scenario. As shown in FIG. 13, the signaling flow includes:

M1. UE-1 sends a Refer message to UE-3. The address of the Refer-To header of the message is the SIP URI of UE-4, and the Replace header of the message is the dialog ID of dialog 2 between UE-1 and the MMSC AS.

M2. The MMSC AS generates a new Refer message, modifies the dialog ID of the dialog between UE-1 and the MMSC AS in the Replace header to the dialog ID of dialog 3 between the MMSC AS and UE-4, and sends the new Refer message to UE-3.

M3. UE-3 returns an OK message.

M4. UE-3 sends a new Invite message to UE-3 according to the foregoing Refer message. The Replace header of the new Invite message is the dialog ID of dialog 3 between UE-4 and the MMSC AS.

M5. UE-4 returns a 200 OK message. This message carries media information of UE-4.

After step M5, the link between UE-4 and UE-3 is established successfully.

M6. UE-4 sends a BYE message to the MMSC AS to cut off the connection between UE-4 and UE-1, and the connection between UE-4 and UE-2.

M7-M8. The MMSC AS splits the message, and sends a BYE message to UE-1 and UE-2 respectively.

M9. UE-1 sends a BYE message to UE-4.

M10-M11. The MMSC AS splits the message in step 9, and sends a BYE message to UE-4 and UE-2 respectively to cut off the connection between UE-1 and UE-4, and the connection between UE-2 and UE-4.

Twelfth Embodiment

Figure 14:
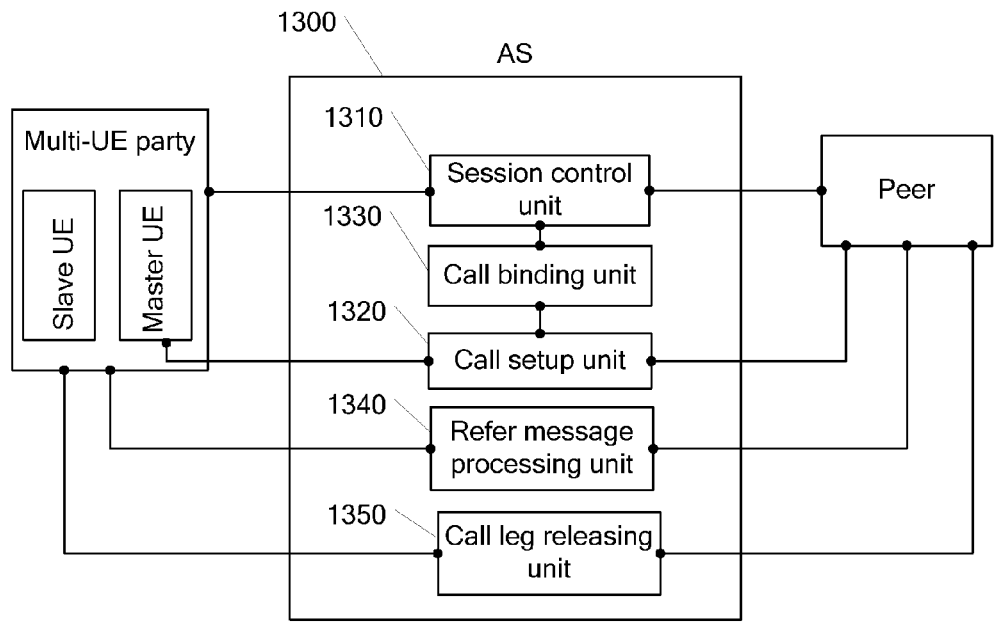
FIG. 14 shows a structure of an AS in a twelfth embodiment of the present invention.

An AS 1300 is provided. As shown in FIG. 14, the AS 1300 includes: a session control unit 1310, configured to control the multi-UE party to perform a multimedia session with the peer; a call establishment unit 1320, configured to control the master UE of the multi-UE party to establish a session with a third party; a call binding unit 1330, configured to bind the call leg between the slave UE of the multi-UE party and the peer to the session established with the third party; a Refer message processing unit 1340, configured to receive a Refer message from the peer, and send the Refer message to the multi-UE party, the Refer message carrying the address of the third party of the call transfer; and a call leg releasing unit 1350, configured to receive the call transfer acknowledgement from the multi-UE party, and therefore, release the call leg between the AS and the peer; and release the call leg between the AS and the master UE of the multi-UE party.

Thirteenth Embodiment

Figure 15:
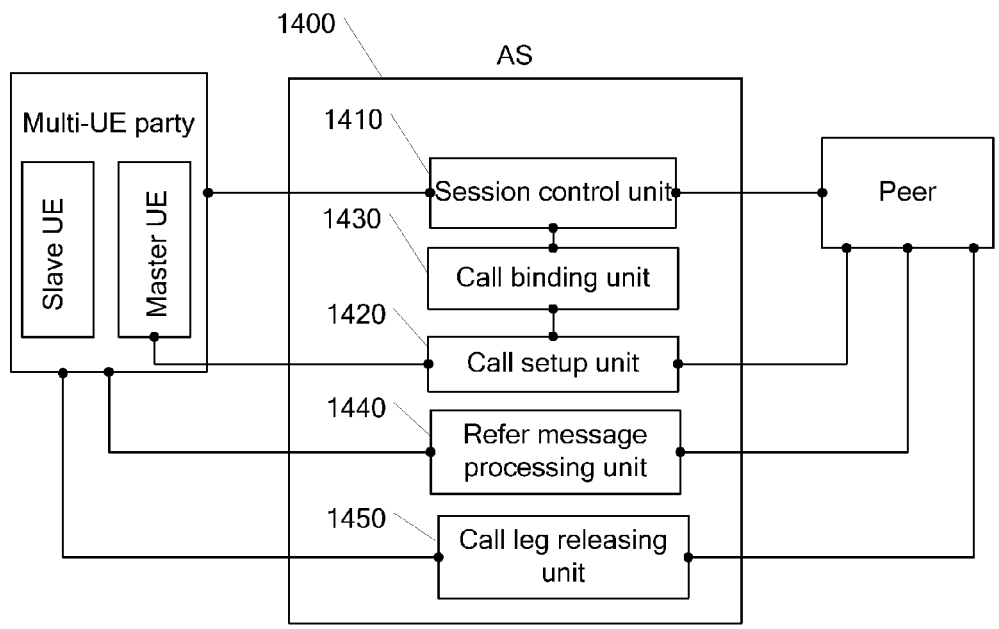
FIG. 15 shows a structure of an AS in a thirteenth embodiment of the present invention.

An AS 1400 is provided. As shown in FIG. 15, the AS 1400 includes: a session control unit 1410, configured to control the multi-UE party to perform a multimedia session with the peer; a call establishment unit 1420, configured to establish a call leg with a third party in place of the multi-UE party; a call binding unit 1430, configured to bind the call leg already established with each UE of the multi-UE party to the call leg established with the third party, and establish a session connection between each UE of the multi-UE party and the third party; a Refer message processing unit 1440, configured to receive a Refer message from the peer, and notify the multi-UE party that the peer requests call transfer, the Refer message carrying the address of the third party of the call transfer; and a call leg releasing unit 1450, configured to release the call leg between the AS and the peer after receiving an OK message from the multi-UE party in response to the notification.

Detailed above are a multimedia session call control method and an AS under the present invention.

According to the embodiments of the present invention, in the multimedia session established between the multi-UE party and the third party, all or part of the existing call legs are reused. By contrast, in the prior art, a multimedia session needs to be reconstructed to implement call transfer. Therefore, the embodiments of the present invention simplify the signaling flow of call transfer, shorten the call transfer time, improve the system processing efficiency, and enhance the user experience.

By comparison, in the embodiments of the present invention, the call transfer message is sent to the master UE of the multi-UE party directly, where the master UE is a PS UE. Compared with the prior art, this embodiment simplifies the signaling, removes the redundant signaling flow, and makes the technical solution under the present invention simpler and more appropriate.

Although the invention is described through some exemplary embodiments, the invention is not limited to such embodiments. It is apparent that those skilled in the art can make various modifications and variations to the invention without departing from the scope of the invention.

What is claimed is:

1. A multimedia session call control method, comprising:
   establishing, by an application server, a first session between a multi-user equipment (UE) party and a first device, wherein the multi-UE party comprises a master UE and a slave UE, and wherein the first session comprises a first call leg between the slave UE and the application server;
   establishing, by the application server, a second session between the master UE and a second device;
   binding, by the application server, the first call leg in the first session to the second session;
   receiving, by the application server, a Refer message from the slave UE, wherein the address of the Refer-To header of the Refer message is the session initiation protocol (SIP) uniform resource identifier (URI);
   sending, by the application server, a notification message to the master UE notifying the master UE that the slave UE is to perform an explicit call transfer supplementary service;
   receiving, by the application server, a notification message from the slave UE comprising an IP address and port number of the second device; and
   sending, by the application server, an Update message through the first call leg, wherein the Update message is configured to establish a media connection between the slave UE and the second device.

2. The method of claim 1, wherein before the master UE establishes the second session with the second device under control of the application server, the method further comprises:
   receiving, by the application server, a Refer message from the first device; and
   sending the Refer message to the master UE, wherein the Refer message is configured to carry an address of the second device.

3. An application server, comprising:
   a memory including computer usable instructions;
   a processor coupled to the memory; and
   a transmitter coupled to the processor,
   wherein the processor is configured to execute the computer usable instructions such that the processor is configured to:
   establish a first session between a multi-user equipment (UE) party and a first device, wherein the multi-UE party comprises a master UE and a slave UE, and wherein the first session comprises a first call leg between the slave UE and the application server;
   establish a second session between the master UE and a second device;
   bind the first call leg in the first session to the second session;
   receive a Refer message from the slave UE, wherein the address of the Refer-To header of the Refer message is the session initiation protocol (SIP) uniform resource identifier (URI);
   send a notification message to the master UE notifying the master UE that the slave UE is to perform an explicit call transfer supplementary service;
   receive a notification message from the slave UE comprising an IP address and port number of the second device; and
   send, using the transmitter, an Update message through the first call leg, wherein the Update message is configured to establish a media connection between the slave UE and the second device.

4. The application server of claim 3, further comprising a receiver coupled to the processor, wherein the receiver is configured to receive a Refer message from the first device before the master UE establishes the second session with the second device under control of the application server, wherein the transmitter is configured to send the Refer message to the master UE, and wherein the Refer message is configured to carry an address of the second device.

5. A non-transitory computer-readable medium having computer usable instructions stored thereon for execution by a processor, wherein the computer usable instructions cause the processor to:
- establish a first session between a multi-user equipment (UE) party and a first device, wherein the multi-UE party comprises a master UE and a slave UE, and wherein the first session comprises a first call leg between the slave UE and an application server;
- establish a second session between the master UE and a second device;
- bind the first call leg in the first session to the second session;
- receive a Refer message from the slave UE, wherein the address of the Refer-To header of the Refer message is the session initiation protocol (SIP) uniform resource identifier (URI);
- send a notification message to the master UE notifying the master UE that the slave UE is to perform an explicit call transfer supplementary service;
- receive a notification message from the slave UE comprising an IP address and port number of the second device; and
- send, using the transmitter, an Update message through the first call leg, wherein the Update message is configured to establish a media connection between the slave UE and the second device.

6. The non-transitory computer-readable medium of claim 5, wherein the computer usable instructions further cause the processor to:
- receive a Refer message from the first device before the master UE establishes the second session with the second device under control of the application server;
- send the Refer message to the master UE, wherein the Refer message is configured to carry an address of the second device; and
- send an Update message through the first call leg, and wherein the Update message is configured to establish a media connection between the slave UE and the second device.

* * * * *